United States Patent [19]

Wang

[11] Patent Number: 5,414,844
[45] Date of Patent: May 9, 1995

[54] METHOD AND SYSTEM FOR CONTROLLING PUBLIC ACCESS TO A PLURALITY OF DATA OBJECTS WITHIN A DATA PROCESSING SYSTEM

[75] Inventor: Diana S. Wang, Trophy Club, Tex.

[73] Assignee: International Business Machines Corporation, Armonk, N.Y.

[21] Appl. No.: 528,624

[22] Filed: May 24, 1990

[51] Int. Cl.$^6$ .............................................. G06F 12/14
[52] U.S. Cl. .............................. 395/650; 364/DIG. 1; 364/286.4; 364/286.5
[58] Field of Search .................. 364/DIG. 1, DIG. 2; 395/600, 700

[56] References Cited

U.S. PATENT DOCUMENTS

| | | | |
|---|---|---|---|
| 4,979,098 | 12/1990 | Baum et al. | 364/200 |
| 5,018,096 | 5/1991 | Aoyama | 364/900 |
| 5,093,918 | 3/1992 | Heyen et al. | 395/725 |
| 5,222,234 | 6/1993 | Wang et al. | 395/600 |
| 5,263,165 | 11/1993 | Janis | 395/725 |

FOREIGN PATENT DOCUMENTS

| | | | |
|---|---|---|---|
| 0150522 | 8/1985 | European Pat. Off. | G06F 12/14 |
| 0407060A2 | 1/1991 | European Pat. Off. | G06F 12/14 |

OTHER PUBLICATIONS

Authors: Michael L. Scott, Thomas J. LeBlanc, and Brian D. Marsh Article: "Design Rationale for Psyche, a General-Purpose Multiprocessor Operating System" Proceedings of the 1988 International Conference on Parallel Processing, Aug. 15–19, 1988.

Primary Examiner—Kevin A. Kriess
Assistant Examiner—Kakali Chaki
Attorney, Agent, or Firm—David A. Mims; Andrew J. Dillon

[57] ABSTRACT

A method and system is disclosed for efficiently controlling public access to a plurality of data objects stored within a data processing system. An access control profile is associated with each data object. Each access control profile preferably includes an explicit authorization parameter listing the identity of a particular user and the authorization level granted to that user; a shared authorization parameter listing the identities of a plurality of users and the authorization level granted to each listed user; and, a public authorization parameter listing the authorization level granted to each user not specifically set forth within the access control profile. A single "public" user identity is then defined for all users not specifically set forth within the access control profile, and that identity, as well as a public authorization level for an entire group of data objects is listed within a single shared authorization parameter. That shared authorization parameter is then placed within the access control profile of each data object within the group. Thereafter, a reference to the shared authorization parameter is placed within the public authorization parameter of each data object within the group so that public access to the entire group of data objects may be centrally controlled by means of a single shared authorization parameter.

4 Claims, 4 Drawing Sheets

METHOD AND SYSTEM FOR CONTROLLING PUBLIC ACCESS TO A PLURALITY OF DATA OBJECTS WITHIN A DATA PROCESSING SYSTEM

BACKGROUND OF THE INVENTION

1. Technical Field

The present invention relates in general to methods and systems of improving data processing systems and in particular to methods and systems for controlling public access to a plurality of data objects stored within a data processing system. Still more particularly, the present invention relates to methods and systems for centrally controlling public access to a plurality of data objects stored within a data processing system.

2. Description of the Related Art

In modern data processing systems the control of access to various documents and applications within the system is well known. In highly controlled security systems, access to a particular data object may only be obtained after entering a selected password and/or complying with various security procedures which serve to certify that a particular user is indeed the user authorized to access that particular data object.

In more complicated data processing systems, access control may be further defined by selectively identifying not only a particular user but also the level of authority which that user may enjoy. For example, a particular user may be permitted to read a selected data object, but not permitted to modify that data object. Similarly, a user may be authorized to write data to a selected data object, but not permitted to read other portions of that object. Of course, those skilled in the art that various other combinations of authority levels may be implemented with such a system.

In International Business Machines' Document Interchange Architecture access control to various data objects stored within a data processing system is controlled by an access control profile known as the Access Control Model Object (ACMO). The ACMO serves a repository for access control information about an associated document and includes: the identity of the document owner, the identity of any users to whom some form of access authority has been granted; the duration for which the document must be retained within the system; and, the security level requested for the document.

Access control to a selected document is specified within the ACMO utilizing one of several authorization parameters. An explicit authorization parameter is utilized to list the specific identity of a particular user and the authorization level of that user. A shared authorization parameter is utilized to list the identity of a shared authorization list, which contains the identities of multiple users and the authorization level of each user, for a group of data objects. Finally, a public authorization parameter is utilized to set forth the authorization level of any user not specifically set forth within the ACMO.

While the aforementioned system provides an excellent method of controlling access to selected data objects stored within a data processing system, it does not provide a method whereby a user may effectively control unspecified or "public" access to a group of data objects. For example, a user may wish to grant public access at an identical authorization level with regard to a large number of data objects. Under existing architectures a user must access each data object individually and thereafter alter the content of the public authorization parameter within each data object. It should therefore be apparent that a need exists for a method and system whereby public access to a plurality of data objects may be centrally controlled.

SUMMARY OF THE INVENTION

It is therefore one object of the present invention to provide an improved method and system of administering a data processing system.

It is yet another object of the present invention to provide an improved method and system for controlling public access to a plurality of data objects stored within a data processing system.

It is yet another object of the present invention to provide an improved method and system for centrally controlling public access to a plurality of data objects stored within a data processing system.

The foregoing objects are achieved as is now described. An access control profile is associated with each data object stored within a data processing system. Each access control profile preferably includes an explicit authorization parameter listing the identity of a particular user and the authorization level granted to that user; a shared authorization parameter listing the identities of a plurality of users and the authorization level granted to each listed user; and, a public authorization parameter listing the authorization level granted to each user not specifically set forth within the access control profile. A single "public" user identity is then defined for all users not specifically set forth within the access control profile, and that identity, as well as a public authorization level for an entire group of data objects is listed within a single shared authorization parameter. That shared authorization parameter is then placed within the access control profile of each data object within the group. Thereafter, a reference to the shared authorization parameter is placed within the public authorization parameter of each data object within the group so that public access to the entire group of data objects may be centrally controlled by means of a single shared authorization parameter.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
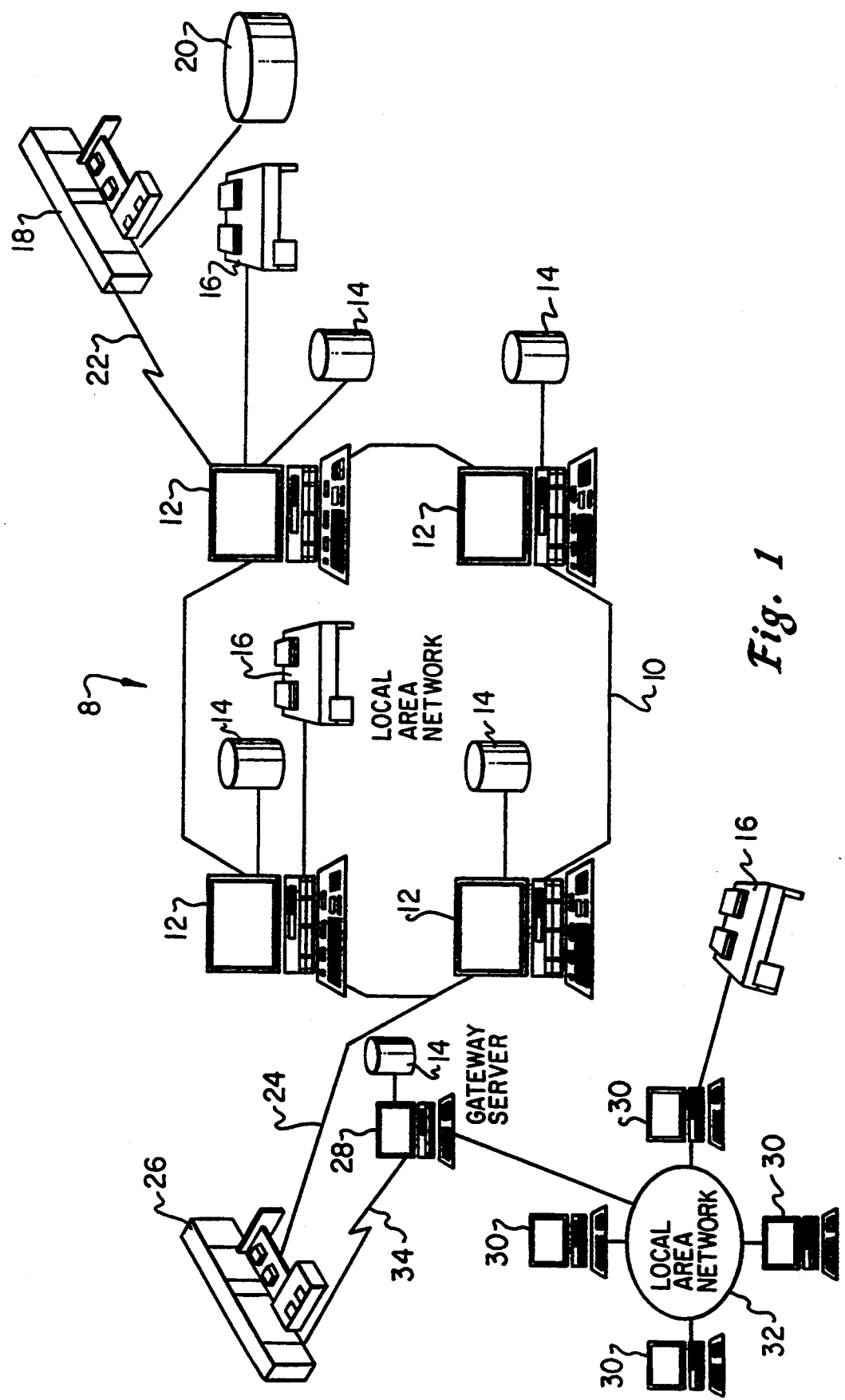
FIG. 1 is a pictorial representation of a distributed data processing system which may be utilized to implement the method and system of the present invention.

With reference now to the figures and in particular with reference to FIG. 1, there is depicted a pictorial representation of a data processing system 8 which may be utilized to implement the method and system of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common is such data processing systems, each individual computer may be coupled to a storage device 14 and/or a printer/output device 16. One or more such storage devices 14 may be utilized, in accordance with the method of the present invention, to store the various data objects or documents which may be periodically accessed and processed by a user within data processing system 8, in accordance with the method of the present invention. In a manner well known in the prior art, each such data processing procedure or document may be stored within a storage device 14 which is associated with a Resource Manager or Library Service, which is responsible for maintaining and updating all resource objects associated therewith.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10 may be coupled via communications controller 27 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data processing procedures or documents may be stored within storage device 20 and controlled by mainframe computer 18, as Resource Manager or Library Service for the data processing procedures and documents thus stored. Of course, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California while Local Area Network (LAN) 10 may be located within Texas and mainframe computer 18 may be located in New York.

As will be appreciated upon reference to the foregoing, it is often desirable for users within one portion of distributed data processing network 8 to access a data object or document stored in another portion of data processing network 8. In order to maintain a semblance of order within the documents stored within data processing network 8 it is often desirable to implement an access control program. As discussed above, this is generally accomplished by listing those users authorized to access each individual data object or document, along with the level of authority that each user may enjoy with regard to a document. Additionally, it is well known to permit a group of users to access a particular document or a listed user to access a group of documents by identifying a user and the level of authority permitted in a shared authorization parameter stored within an access control profile associated with multiple data objects or documents.

However, as those skilled in the art will appreciate, it is often necessary or desirable to permit a user to access a particular document when that user has not been previously set forth as an authorized accessor within an access control profile. This so-called "public" access is generally permitted at a selected authority level with regard to those documents for which the existing security level permits access by a large number of individuals. This is generally accomplished in the prior art by setting forth a public authorization level within an access control profile, which sets forth the authorization level for any individual user not specifically set forth within the access control profile.

Those skilled in the art will appreciate that the setting forth of an authorization level for a large group of documents may only be accomplished in the prior art by accessing each individual data object and thereafter altering the content of the public authorization parameter for that data object. The method of the present invention sets forth a manner by which public access to a large group of data objects may be centrally controlled.

Figure 2:
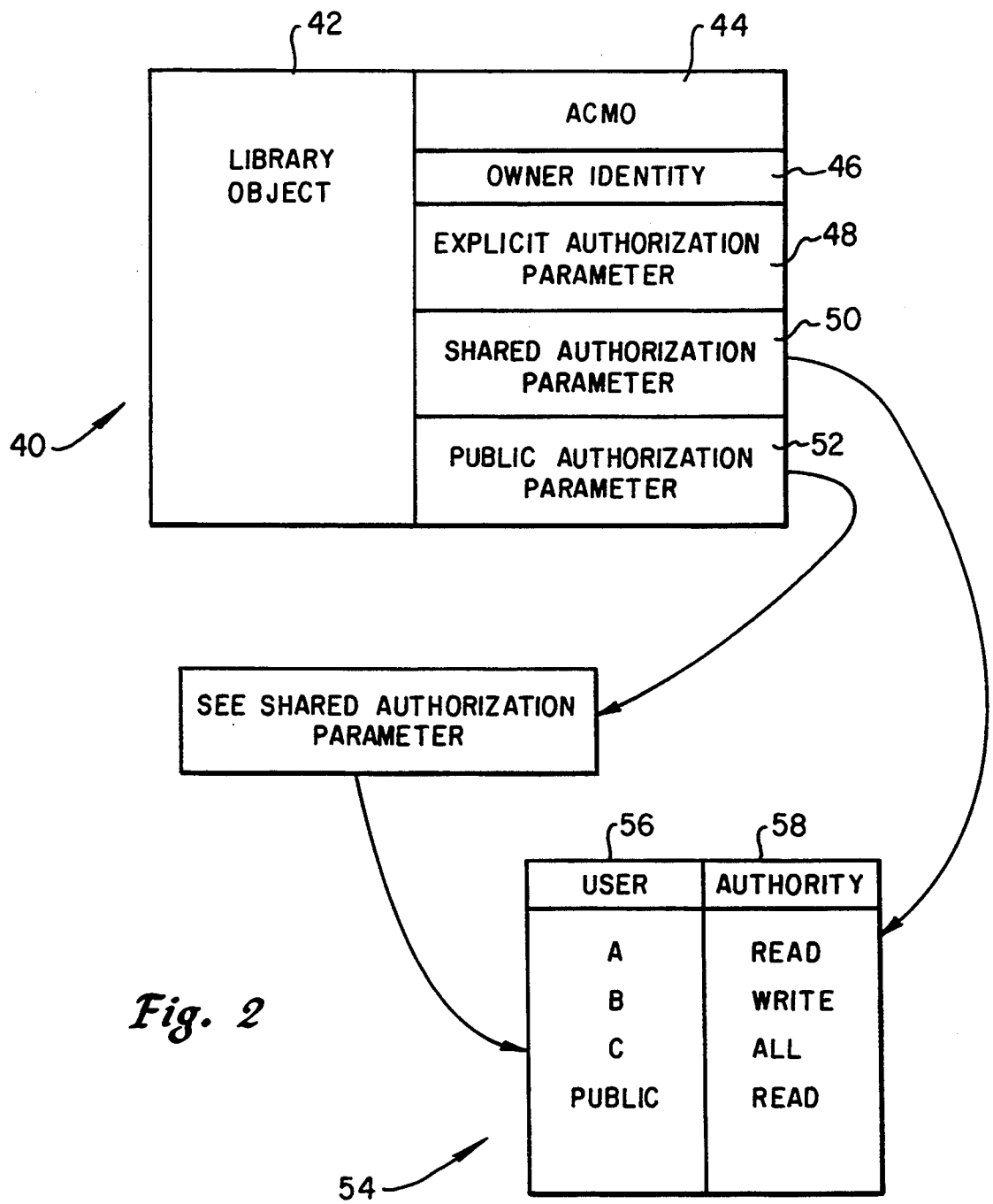
FIG. 2 is a pictorial representation of a data object and its associated access control profile, in accordance with the method and system of the present invention.

Referring now to FIG. 2 there is depicted a pictorial representation of a data object and its associated access control profile, in accordance with the method and system of the present invention. As may be seen, a data object 40 is illustrated. Data object 40 includes a library object 42 and an Access Control Model Object (ACMO) 44. Listed within ACMO 44 is an owner identity 46 which sets forth the name of the user owning library object 42. Additionally, an explicit authorization parameter 48 is listed and utilized, in a manner well known in the prior art, to set forth the identity or identities of specific individual users and the authority level which each such listed user enjoys with regard to library object 42.

Also listed within ACMO 44 is a shared authorization parameter 50 which sets forth a list of the identities of multiple users and the authority levels enjoyed by those users with regard to a plurality of library objects which all utilize shared authorization parameter 50. Finally, public authorization parameter 52 is listed within ACMO 44 and is utilized to set forth the authorization level which is permitted for any user not specifically set forth within explicit authorization parameter 48, or shared authorization parameter 50. In accordance with an important feature of the present invention, public authorization parameter 52 may be utilized in a manner other than setting forth the authorization level permitted for public users for library object 42.

As is illustrated, public authorization parameter 52 may include a reference to shared authorization parameter 50. Shared authorization parameter 50 is set forth in greater detail at reference numeral 54 and includes a column of user identities 56 and associated authority level for each user set forth within column 58. As is illustrated, user A is authorized to read library object 42 and any other library object which includes shared authorization parameter 50 within its associated ACMO.

Similarly, user B is authorized to write into library object 42, as well as any other library object which includes shared authorization parameter 50 within its associated ACMO. In like manner, user C is permitted unlimited authority with regard to library object 42 and any other library object which includes shared authorization parameter 50.

Finally, in accordance with the method of the present invention, a user identity "PUBLIC" is set forth within column 56 of shared authorization parameter 50 and an associated authority level is listed within column 58 of shared authorization parameter 50. Those skilled in the art will appreciate upon reference to the foregoing that by defining a single user identity for all those users not specifically set forth within ACMO 50, and by setting forth an authority level for all such users within shared authorization parameter 50, public access to library object 42, and all other library objects which include shared authorization parameter 50, may be simply and efficiently controlled by inserting a reference to shared authorization parameter 50 within the public authorization parameter for each such library object.

Figure 3:
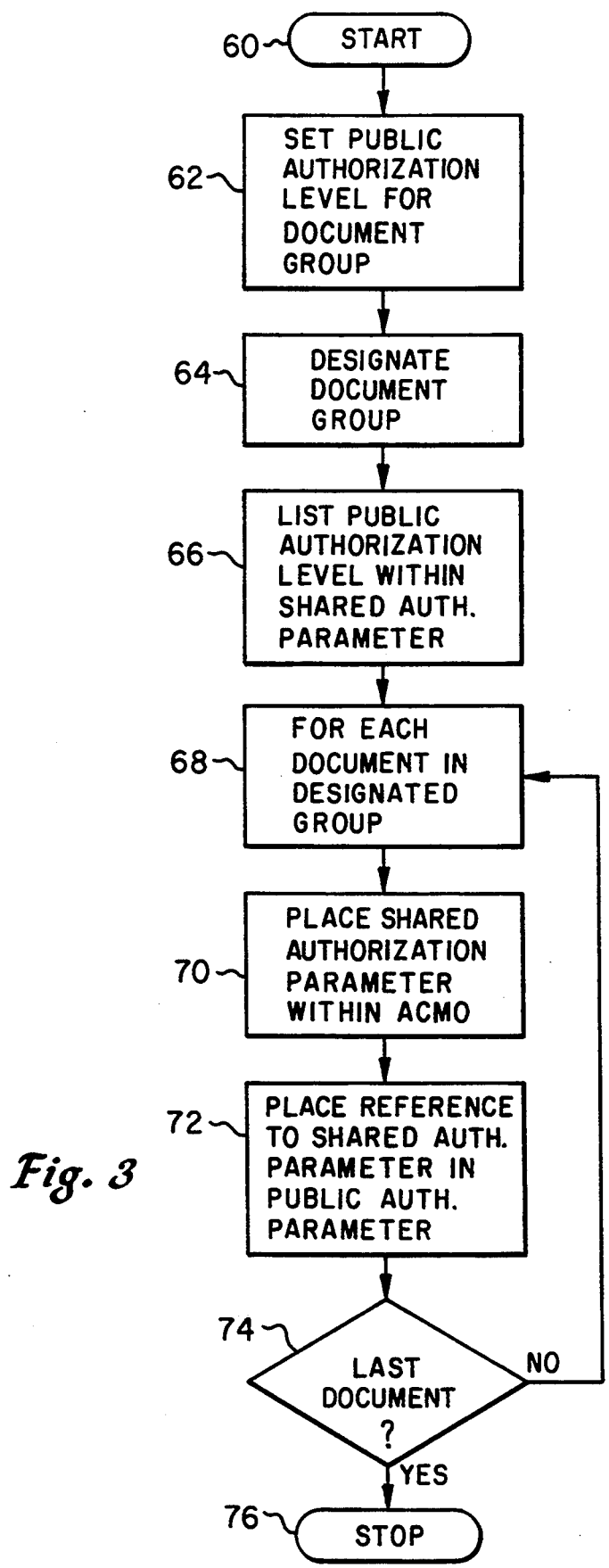
FIG. 3 is a high level flow chart depicting the establishment of access control for a plurality of data objects in accordance with the method and system of the present invention.

With reference now to FIG. 3, there is depicted a high level flow chart which illustrates the establishment of access control for a plurality of data objects in accordance with the method and system of the present invention. As is illustrated, the process begins at block 60 and thereafter passes to block 62 wherein the user sets a public authorization level for a document group. Next, the process passes to block 64 which illustrates the designating of those documents which will be included within the document group. Thereafter, the public user authorization level set by the user is listed within a shared authorization parameter, in the manner depicted within FIG. 2.

Next, as illustrated in block 68, for each document within the document group the following steps are accomplished. First, block 70 illustrates the placing of the shared authorization parameter containing the desired public authorization level within the Access Control Model Object (ACMO) for each document within the document group. Thereafter, a reference to the shared authorization parameter is placed within the public authorization parameter within the ACMO of each document within the group, such that an attempted access by a user not specifically set forth within the ACMO will result in a reference to the single shared authorization parameter which sets forth the public authorization level for each document within the group of documents. Block 74 then illustrates a determination of whether or not the document being processed is the last document within the group and, if not, the process returns to block 68 and proceeds in an iterative fashion. If the document currently being processed is the last document within the designated document group, the process terminates, as illustrated in block 76.

Figure 4:
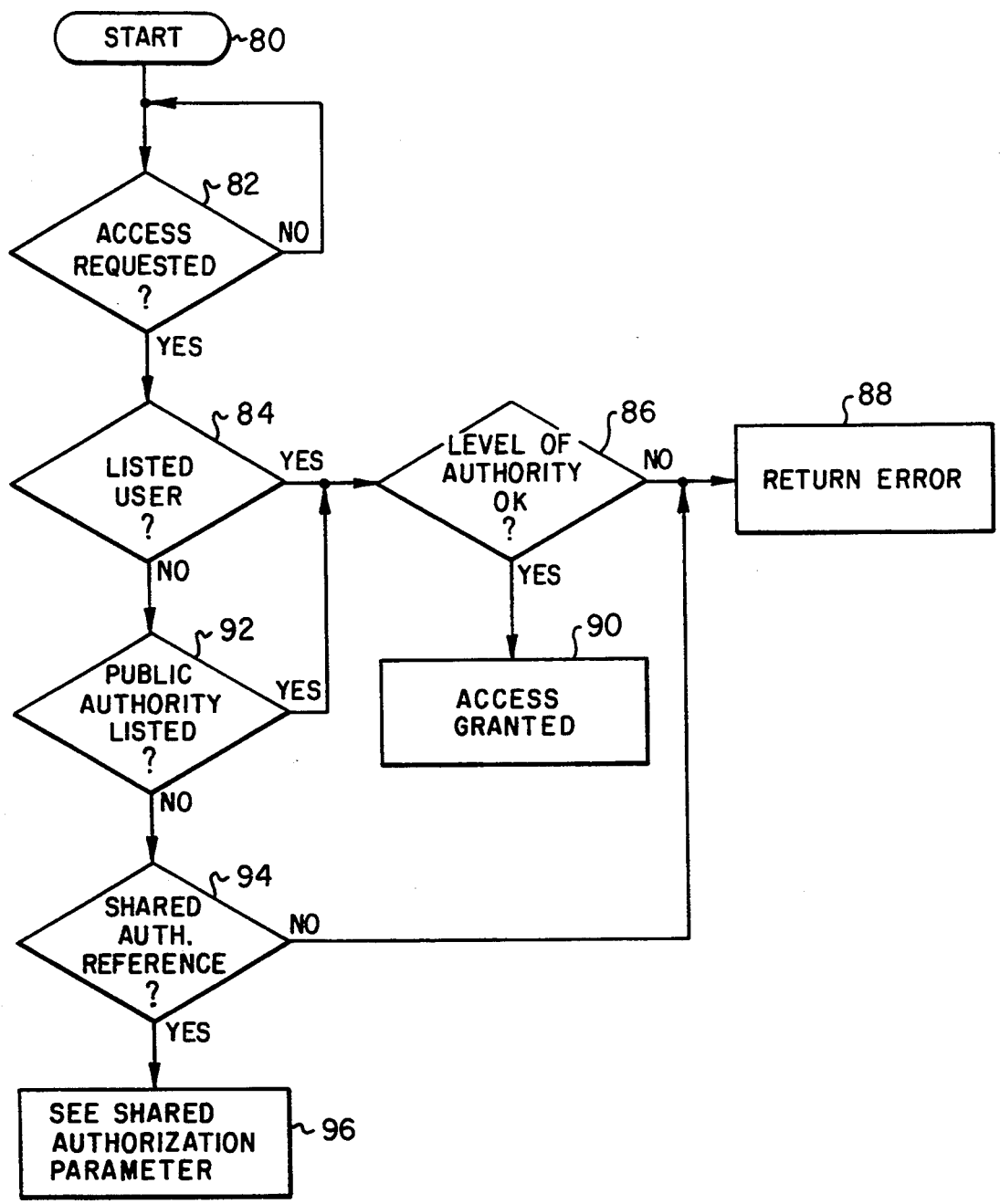
FIG. 4 is a high level flow chart depicting the accessing of a data object in accordance with the method and system of the present invention.

Referring now to FIG. 4, there is depicted a high level flow chart which illustrates the accessing of a data object in accordance with the method and system of the present invention. As is illustrated, the process begins at block 80 and thereafter passes to block 82 which depicts a determination of whether or not an access of a document or data object has been requested. If not, the process merely iterates until such time as access has been requested.

After access of a particular document has been requested, as determined in block 82, block 84 illustrates a determination of whether or not the user requesting access is a listed user. By "listed user" what is meant is a user whose identity is specifically set forth within the ACMO for the document in question. If the user requesting access to the document is a listed user, as determined in block 84, block 86 illustrates a determination of whether or not the user in question possesses a sufficient authority level for the action desired. If not, an error message is returned, as is illustrated in block 88. If the user in question has sufficient authority level for the action desired, then access is granted, as depicted in block 90.

Referring again to block 84, in the event the user requesting access to a particular document is not a listed user specifically set forth within the ACMO, then block 92 illustrates a determination of whether or not a specific public authority level is set forth within the public authority parameter for the data object in question. If so, the process passes to block 86 for a determination of whether or not the public user in question possesses sufficient authority for the action desired. As above, access is either granted or an error message is returned based upon a determination of a public user's authority level.

Referring again to block 92, in the event a specific public authority level is not listed within the public authority parameter of the ACMO for the document in question, block 94 illustrates a determination of whether or not the public authority parameter includes a reference to the shared authority parameter. If not, the system returns an error message and access is denied. However, in the event the public authority parameter does include a reference to the shared authority parameter block 96 illustrates a determination of the authority level for a public user which is established in accordance with those parameters set forth within the shared authorization parameter, as described above.

After determining the public authority level from the shared authorization parameter the process again returns to block 86 for a determination of whether or not the public authority level is sufficient for the action desired by the user. Thereafter, access is either denied or granted, in accordance with that determination.

Upon reference to the foregoing those skilled in the art will appreciate that the Applicant in the present invention has set forth a method and system whereby public access to a large number of data objects may be centrally controlled by defining a user identity for all those users not specifically set forth within an access control profile for a particular document and setting forth an authority level for that user identity within a single shared authorization parameter which may then be placed within the access control profile of a large number of data objects. By simply including a reference to the shared authorization parameter within the public authorization parameter in each such document, the authority level for a public user with respect to a large number of documents may be simply and efficiently set forth in a single location.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for controlling public access to a plurality of data objects stored therein, said data processing system having an access control profile associated with each data object stored therein, each access control profile including: an explicit authorization parameter listing the identity of a user and the authorization level granted to that user; a shared authorization parameter setting forth a shared authorization list associated with the access control profile of each of a plurality of data objects and containing the identities of a plurality of users and the authorization level granted to each listed user; and, a public authorization parameter listing the authorization level granted to each user not specifically identified within said access control profile, said method comprising the data processing system implemented steps of:

creating and storing within said shared authorization list a "public" user identity for users not specifically identified within the access control profiles of the plurality of data objects;

listing within said shared authorization list within said data processing system an authorization level for said "public" user identity for all of a plurality of data objects within said data processing system;

listing said shared authorization list within a shared authorization parameter within the access control profile of each of said plurality of data objects within said data processing system;

storing a reference within said public authorization parameter to said shared authorization parameter within the access control profile of each of said plurality of data objects within said data processing system; and thereafter, controlling public access for each of said plurality of data objects by:

accessing said shared authorization parameter by accessing said reference to said shared authorization parameter stored within said public authorization parameter within the access control profile of a selected one of said plurality of data objects in response to an attempted access by a user after it is determined that the user is not listed within said explicit authorization parameter for said selected one of said plurality of data objects;

accessing said shared authorization list set forth within said shared authorization parameter within the access control profile of said selected one of said plurality of data objects; and granting access to said selected one of said plurality of data objects by said user not listed within said explicit authorization parameter for said selected one of said plurality of data objects in accordance with an authorization level granted to said "public" user identity within said shared authorization list for said selected one of said plurality of data objects.

2. The method in a data processing system for controlling public access to a plurality of data objects stored therein according to claim 1, further including the step of storing an identity of an owner of each of said plurality of data objects within said access control profile.

3. A data processing system for controlling public access to a plurality of data objects stored therein, said data processing system having an access control profile associated with each data object stored therein, each access control profile including: an explicit authorization parameter listing the identity of a user and the authorization level granted to that user; a shared authorization parameter setting forth a shared authorization list associated with the access control profile of each of a plurality of data objects and containing the identities of a plurality of users and the authorization level granted to each listed user; and, a public authorization parameter listing the authorization level granted to each user not specifically identified within said access control profile, said data processing system comprising:

a storage device;

storage means for storing within said storage device within said shared authorization list a "public" user identity created for users not specifically identified within the access control profiles of the plurality of data objects, means for listing within said shared authorization list an authorization level for said "public" user identity for all of a plurality of data objects within said data processing system;

means for listing said shared authorization list within a shared authorization parameter within the access control profile of each of said plurality of data objects within said data processing system;

means for storing a reference within said public authorization parameter to said shared authorization parameter within the access control profile of each of said plurality of data objects within said data processing system; and control means for controlling public access for each of said plurality of data objects, the control means including:

means for accessing said shared authorization parameter by accessing said reference to said shared authorization parameter stored within said public authorization parameter within the access control profile of a selected one of said plurality of data objects in response to an attempted access by a user after it is determined that the user is not listed within said explicit authorization parameter for said selected one of said plurality of data objects;

means for accessing said shared authorization list set forth within said shared authorization parameter within the access control profile of said selected one of said plurality of data objects; and means for granting access to said selected one of said plurality of data objects in accordance with an authorization level granted to said "public" user identity within said shared authorization list for said selected one of said plurality of data objects.

4. The data processing system for controlling public access to a plurality of data objects stored therein according to claim 3, further including means for storing an identity of an owner of each of said plurality of data objects within said access control profile.

* * * * *